(12) United States Patent
Hamad et al.

(10) Patent No.: US 8,349,948 B2
(45) Date of Patent: Jan. 8, 2013

(54) THERMOPLASTIC NANOCOMPOSITE MATERIAL BASED ON NANOCRYSTALLINE CELLULOSE (NCC)

(75) Inventors: Wadood Y. Hamad, Vancouver (CA); Shunxing Su, Richmond (CA)

(73) Assignee: FPInnovations, Pointe Claire, QC (CA)

( * ) Notice: Subject to any disclaimer, the term of this patent is extended or adjusted under 35 U.S.C. 154(b) by 0 days.

(21) Appl. No.: 13/018,807

(22) Filed: Feb. 1, 2011

(65) Prior Publication Data
US 2011/0201755 A1 Aug. 18, 2011

Related U.S. Application Data

(60) Provisional application No. 61/305,742, filed on Feb. 18, 2010.

(51) Int. Cl.
*C08B 37/00* (2006.01)
(52) U.S. Cl. ........... 525/54.3; 524/35; 525/63; 525/185; 525/186; 527/313; 527/314
(58) Field of Classification Search ............... 525/54.3, 525/63, 185, 186; 524/35; 527/313, 314
See application file for complete search history.

(56) References Cited

U.S. PATENT DOCUMENTS 4,057,683 A * 11/1977 Elting .......................... 526/194

OTHER PUBLICATIONS

Hamad, W.; Canadian Journal of Chemical Engineering, vol. 84, Issue 5, 2006. Retrieved online from URL: <http://www.thefreelibrary.com/_/print/PrintArticle.aspx?id=159508083>, p. 1-13.*
Samir, M.; Alloin, F.; Dufresne, A., Review of recent research into cellulosic whiskers, their properties and their application in nanocomposite field. Biomacromolecules 2005, 6, (2), 612-626.
Lima, M. M. D.; Borsali, R., Rodlike cellulose microcrystals: Structure, properties, and applications. Macromolecular Rapid Communications 2004, 25, (7), 771-787.
Araki, J.; Wada, M.; Kuga, S., Steric stabilization of a cellulose microcrystal suspension by poly(ethylene glycol) grafting. Langmuir 2001, 17, (1), 21-27.
Habibi, Y.; Dufresne, A., Highly filled bionanocomposites from functionalized polysaccharide nanocrystals. Biomacromolecules 2008, 9, (7), 1974-1980.
Ljungberg, N.; Bonini, C.; Bortolussi, F.; Boisson, C.; Heux, L.; Cavaille, J. Y., New nanocomposite materials reinforced with cellulose whiskers in atactic polypropylene: Effect of surface and dispersion characteristics. Biomacromolecules 2005, 6, (5), 2732-2739.
Bhattacharya, A.; Misra, B. N., Grafting: a versatile means to modify polymers—Techniques, factors and applications. Progress in Polymer Science 2004, 29, (8), 767-814.
Don, T. M.; King, C. F.; Chiu, W. Y., Synthesis and properties of chitosan-modified poly(vinyl acetate). Journal of Applied Polymer Science 2002, 86, (12), 3057-3063.
Lai, S. M.; Don, T. M.; Liu, Y. H.; Chiu, W. Y., Graft polymerization of vinyl acetate onto granular starch: Comparison on the potassium persulfate and ceric ammonium nitrate initiated system. Journal of Applied Polymer Science 2006, 102, (3), 3017-3027.
Chen, F.; Cheng, Z. P.; Zhu, J.; Zhang, W.; Zhu, X. L, Synthesis of poly(vinyl acetate) with fluorescence via a combination of RAFT/MADIX and "click" chemistry. European Polymer Journal 2008, 44, (6), 1789-1795.
Lee, H. F.; Kuo, S. W.; Huang, C. F.; Lu, J. S.; Chan, S. C.; Wang, C. F.; Chang, F. C., Hydrogen-bonding interactions mediate the phase behavior of an A-B/C block copolymer/homopolymer blend comprising poly(methyl methacrylate-b-vinylpyrrolidone) and poly(vinylphenol). Macromolecules 2006, 39, (16), 5458-5465.
Kristensen, J. H.; Bampos, N.; Duer, M., Solid state C-13 CP MAS NMR study of molecular motions and interactions of urea adsorbed on cotton cellulose. Physical Chemistry Chemical Physics 2004, 6, (12), 3175-3183.
Kuo, S. W.; Chang, F. C., Miscibility and hydrogen bonding in blends of poly(vinylphenol-co-methyl methacrylate) with polyethylene oxide). Macromolecules 2001, 34, (12), 4089-4097.
Roy, D., Semsarilar, M., Guthrie, J.T., Perrier, S., Cellulose Modification by Polymer Grafting: A Review, Chem. Soc. Rev., 2009, 38, 2046-2064.
Doba, T., Rodehed, C., Ranby, B., Mechanism of Graft Copolymerization onto Polysaccharides Initiated by Metal Ion Oxidation Reactions of Model Compounds for Starch and Cellulose, Macromolecules 1984, 17, 2512-2519.
Kuisma Littunen et al., "Free radical graft copolymerization of nanofibrillated cellulose with acrylic monomers", Carbohydrate Polymers, vol. 84, p. 1039-1047 (2011) entire document.
Garcia de Rodriguez, N.L. et al., "Sisal cellulose whiskers reinforced polyvinyl acetate nanocomposites", Cellulose, vol. 13, p. 261-270 (2006) entire document.
International Search Report, PCT/CA2011/000114, dated May 19, 2011.

* cited by examiner

*Primary Examiner* — David W Wu
*Assistant Examiner* — Robert Jones, Jr.
(74) *Attorney, Agent, or Firm* — Norton Rose Canada LLP

(57) ABSTRACT

A green approach for the development of nanocomposite materials comprising nanocrystalline cellulose (NCC) and appropriate vinyl polymers is conceived. The approach deals with the in-situ graft co-polymerization of hydrophobic vinyl monomers, such as vinyl acetate and methyl methacrylate, onto the NCC surface in an aqueous medium. The resulting material is significantly more hydrophobic and thermally stable than the starting NCC. The nanocomposite material can be suspended in appropriate solvents, dried and molded with other materials using conventional polymer processing techniques to develop yet new materials with new characteristics. These nanocomposites have wide ranging applications from industrial to medical use.

11 Claims, 11 Drawing Sheets

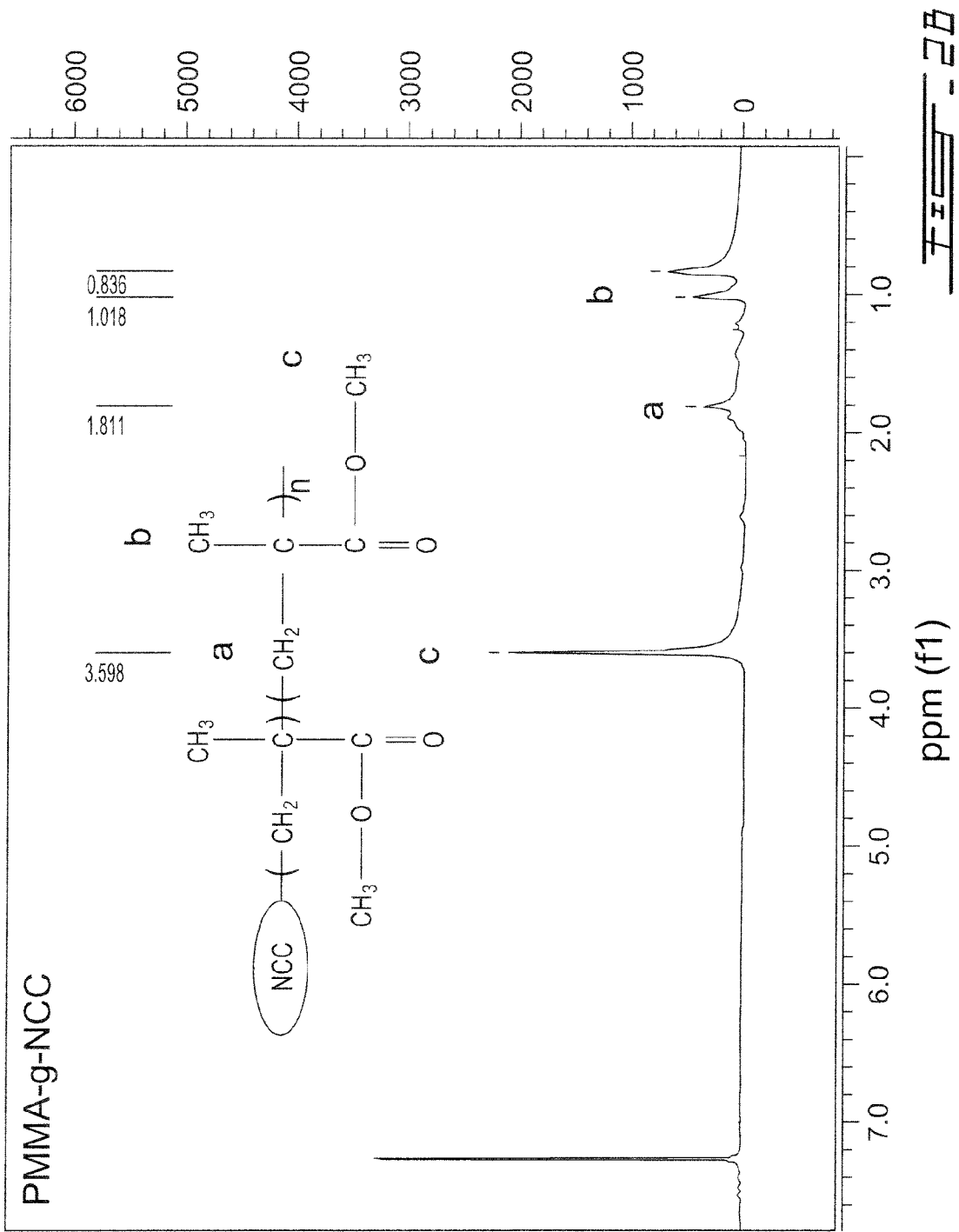

| Sample | Assigned proton | ppm |
|---|---|---|
| NCC—(CH₂—CH)—(CH₂—CH)ₙ—O—C(=O)—CH₃ (a,b,c with O—C(=O)—CH₃) | a | 1.755 |
| | b | 4.78 |
| | c | 1.9–1.97 |
| NCC—(CH₂—C(CH₃)(CH₃—O—CH₃))—(CH₂—C(CH₃))ₙ—C(=O)—O—CH₃ | a | 1.81 |
| | b | 0.84 and 1.02 |
| | c | 3.6 |

FIG. 2C

| Sample | Assigned carbon | ppm |
|---|---|---|
| (chemical structure shown) | a | 106 |
| | b,c | 73 |
| | d | 90 |
| | e | 75 |
| | f | 66 |
| | h | 50 |
| | i | 17 |
| | j,l | 53 |
| | k | 179 |

FIG-3B

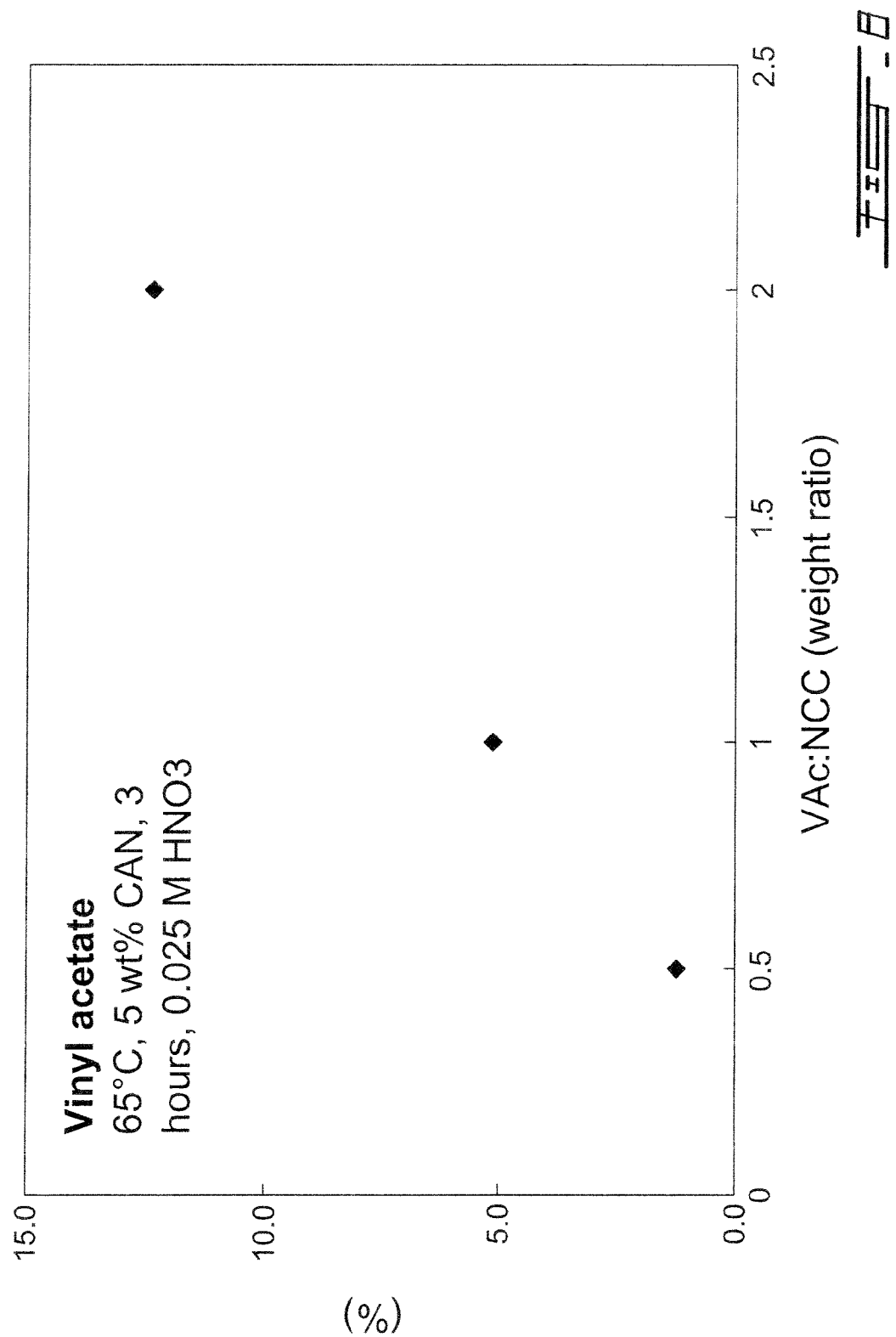

ThermoPLASTIC NANOCOMPOSITE MATERIAL BASED ON NANOCRYSTALLINE CELLULOSE (NCC)

CROSS-REFERENCE TO RELATED APPLICATION

This application claims the benefit under 35 USC 119(e) of U.S. Provisional Application Ser. No. 61/305,742, filed Feb. 18, 2010.

BACKGROUND OF THE INVENTION i) Field of the Invention

This invention relates to a thermoplastic, hydrophobic nanocomposite of nanocrystalline cellulose (NCC) and a hydrophobic vinyl monomer, and a process for producing such a nanocomposite; the process may be considered a green process. The nanocomposite is a sustainable, thermally-stable biomaterial which is hydrophobic and compatible with a wide range of synthetic polymers. The nanocomposite material can be suspended in appropriate solvents, as well as dried and moulded with other materials using conventional polymer processing techniques to develop yet more materials with new characteristics. These nanocomposites have wide ranging applications from industrial to medical use.

ii) Description of the Prior Art

It has been recognized that nanocrystalline cellulose (NCC) can be applied as a reinforcing material in nanocomposites. NCC, a chiral nematic structure of high strength and elastic modulus, is renewable, has a relatively large reactive surface, and is biodegradable. The major obstacles to NCC application in composite manufacture are (1) the dispersion of hydrophilic NCC in mostly hydrophobic polymer matrices and (2) the poor interfacial adhesion between NCC and the polymer. Different approaches have been followed to increase NCC's dispersion and interaction with polymer matrices. NCC has been either coated with surfactant or chemically surface modified.[1,2] Use of surfactants is a simple enough method, but a large amount of surfactant is normally required which would negatively impact the strength of the resulting composite. Surface modification, on the other hand, generally involves reacting with the hydroxyl groups on the NCC surface. Silanes have been employed to graft hydrophobic groups onto the NCC surface. Moreover, some polymers with reactive groups for hydroxyls have been used as well, such as PEG,[3] PCL[4] and PP.[5] These modifications can make NCC more hydrophobic and give NCC reasonable stability in organic solvents. However, these reactions are generally performed in organic solvents and involve several steps.

Surface graft co-polymerization of vinyl monomers onto polysaccharide surfaces, e.g. cellulose, starch, and chitosan, has been investigated extensively.[6-8] Methyl methacrylate, methylacrylate, acrylic acid or vinyl acetate can be used as the monomer of choice. Graft polymerization has been reported using different initiation systems, including photo initiators, UV light, γ-ray radiation, free radical initiators, etc. In these techniques, free radical initiators, such as AIBN, iron(II)-hydrogen peroxide, potassium persulfate, and transition-metal ions, have widely been used. Among the free radical initiators, ceric (IV) ion has shown great efficiency in grafting vinyl monomers onto a number of polysaccharides. The proposed mechanism for the initiation reaction has been ascribed to the formation of a complex with the hydroxyl groups on the polymer backbone, which can dissociate via one electron transfer to give free radicals.

SUMMARY OF THE INVENTION

It is an object of this invention to provide a hydrophobic nanocomposite of nanocrystalline cellulose (NCC) and polymerized hydrophobic vinyl monomer.

It is another object of this invention to provide a process for producing a hydrophobic nanocomposite of nanocrystalline cellulose (NCC) and polymerized hydrophobic vinyl monomer.

It is still another object of this invention to provide a composition comprising a hydrophobic nanocomposite of the invention, compounded or blended with high molecular weight polymer.

In one aspect of the invention, there is provided a hydrophobic nanocomposite of nanocrystalline cellulose (NCC) and polymerized hydrophobic vinyl monomer, in which said polymerized vinyl monomer is grafted on said NCC.

In one aspect of the invention, there is provided a process for producing a hydrophobic nanocomposite of nanocrystalline cellulose (NCC) and a hydrophobic, polymerized vinyl monomer, comprising polymerization of at least one hydrophobic vinyl monomer in the presence of NCC particles.

In yet another aspect of the invention, there is provided a composition comprising a nanocomposite of the invention, compounded or blended with high molecular weight polymer.

BRIEF DESCRIPTION OF THE DRAWINGS

The invention is illustrated and further explained by reference to the accompanying drawings in which;

FIGS. 2A, 2B and 2C comprise an $^1$H NMR of PVAc-g-NCC and PMMA-g-NCC indicating the successful surface grafting of the vinyl monomers onto NCC.

FIGS. 3A and 3B comprise an $^{13}$C NMR of PMMA-g-NCC indicating the successful surface grafting of the vinyl monomer onto NCC.

FIG. 8 shows % nanocomposite produced for different VAc:NCC ratios in the polymerization mix.

BRIEF DESCRIPTION OF THE TABLES

Figure 1:
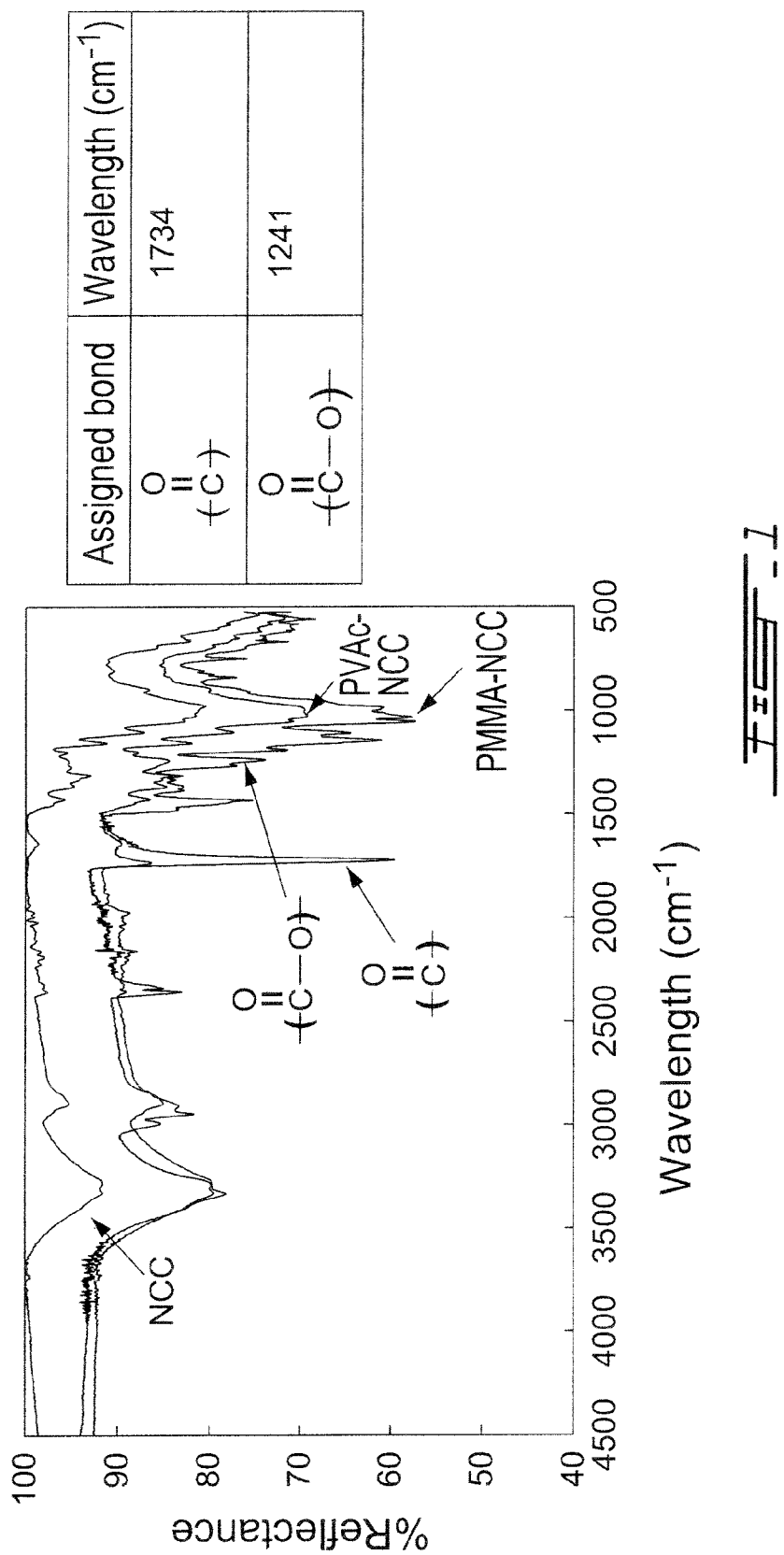
FIG. 1 is an FT-IR of NCC, PVAc-g-NCC and PMMA-g-NCC indicating the successful surface grafting of the vinyl monomers onto NCC.

Table 1: Optimal polymerization conditions for vinyl acetate (VAc) and methyl methacrylate (MMA) with nanocrystalline cellulose (NCC)

Table 2: Size of NCC and PMMA-g-NCC particles in different solvent systems. Grafting yields for polymerization with 2% CAN are reported.

DETAILED DESCRIPTION OF THE INVENTION

A green approach for the development of nanocomposite materials comprising nanocrystalline cellulose (NCC) and appropriate vinyl polymers is described. The approach employs in-situ graft co-polymerization of hydrophobic vinyl monomers onto the NCC surface in an aqueous medium. The approach is described hereinafter by reference to two classes of monomers, vinyl acetate and methyl methacrylate, but other hydrophobic vinyl monomers may be employed.

The nanocomposite material is significantly more hydrophobic and thermally stable than the starting NCC. The nanocomposite material can be suspended in appropriate solvents, as well as dried and moulded with other materials using conventional polymer processing techniques to develop yet more materials with new characteristics. These nanocomposites have wide ranging applications from industrial to medical use.

This invention deals with the development of thermoplastic, hydrophobic nanocomposites via in situ graft co-polymerization of hydrophobic monomers onto the surface of nanocrystalline cellulose (NCC). While any suitable class of hydrophobic vinyl monomer can be used to develop the nanocomposites with NCC, this disclosure focuses on vinyl acetate and methyl methacrylate as the vinyl monomers of choice, by way of illustration of the invention.

Suitable hydrophobic vinyl monomers are in particular those that will polymerize in situ in the presence of NCC, attaching to NCC without crosslinking amongst themselves. Acrylates are suitable monomers, but monomers that will likely crosslink might not be especially suitable. Molecules that have medium range hydrophobicity relative to NCC are suitable.

Water solubility of the hydrophobic vinyl monomer is a factor in selection of the vinyl monomer for the polymerization. If it is too high, then the polymer would be water soluble; if too low, then the graft polymerization will not occur or proceed with difficulty. The water solubility of methylmethacrylate is 1.5 g/100 ml, and of vinyl acetate 2.5 g/100 ml. Suitably the range of solubility is from about 1.5 to about 3 g/100 ml, and as such methyl acrylate having a water solubility of 3 g/100 ml, and ethyl acrylate having a water solubility of 1.5 g/100 ml, are also suitable hydrophobic vinyl monomers for the polymerization.

Mixtures of suitable monomers may be employed, whereby the polymer chain from the NCC may be a copolymer. The polymer chains grafted on the NCC may thus comprise homopolymer chains of the distinct monomers of the mixture as well as copolymer chains comprising the different monomers of the mixture.

The polymerization is carried out in aqueous medium. The ability to use an aqueous medium to carry out the polymerization, with the ultimate aim to create a hydrophobic system is a particularly interesting aspect of the invention, and also has significant advantageous implications for cost-effective manufacturing as well as environmental (green) advantages.

Preferably the polymerization is carried out in an acidic aqueous medium having a pH of less than 7, and in particular 1 to 4. Acidic pH is achieved by addition of an acid such as nitric acid.

The polymerization is suitably carried out at a room temperature (about 20° C.) to 90° C. for 1 to 24 hours, preferably a temperature of 40° C. to 70° C. for 1 to 4 hours.

Typically a free radical initiator is employed to promote the polymerization, and a terminator to terminate polymerization.

The opened olefinic monomer has end free bonds, one of which forms an oxide link through a hydroxyl on an NCC crystal and the other links with a further monomer to form the polymer chain; thus the polymer chain will have a terminal link with the hydroxyl group of NCC.

There may be several polymer chains independently linked to each NCC nanocrystal via hydroxyl groups on the crystal; whereby a single central crystal has several polymer chains radiating from it.

While possible it is unlikely that the outer terminal free bond from the olefinic polymer at the end of the chain could bond through a hydroxyl on an NCC crystal, because of competing reactions. The outer terminal free radical will be terminated mainly by these reactions:

Terminated by Unused Initiator

Reaction with another outer terminal free radical. There are two possibilities. (1) If the reaction takes place with a free radical on a monomer, then it would be terminated. In this case polymer chains extend radially from the crystals.

(2) If however the reaction takes place with a free radical on a polymer chain, then two structures are possible:

(a) If the polymer chains originate from the same crystal, a loop with opposite ends bonded to the crystal is formed.

(b) If the polymer chains originate from different crystals, the crystals are crosslinked. While this is possible, it is likely minimal, it is found that the grafted NCC is suspended well in organic solvents, and aggregates have not been detected.

Transfer to a monomer and start polymerization, which results in ungrafted free polymers.

Grafting yield is the ratio of the weight of modified NCC (i.e. vinyl-grafted NCC) to the weight of original NCC. For the optimal reaction conditions shown in Table 1 herein, the grafting yields are as follows:

For PMMA-g-NCC is 66.4% at MMA:NCC weight ratio=1:1

For PVAc-g-NCC is 12.4% at VAc:NCC weight ratio=2:1

Figure 7:
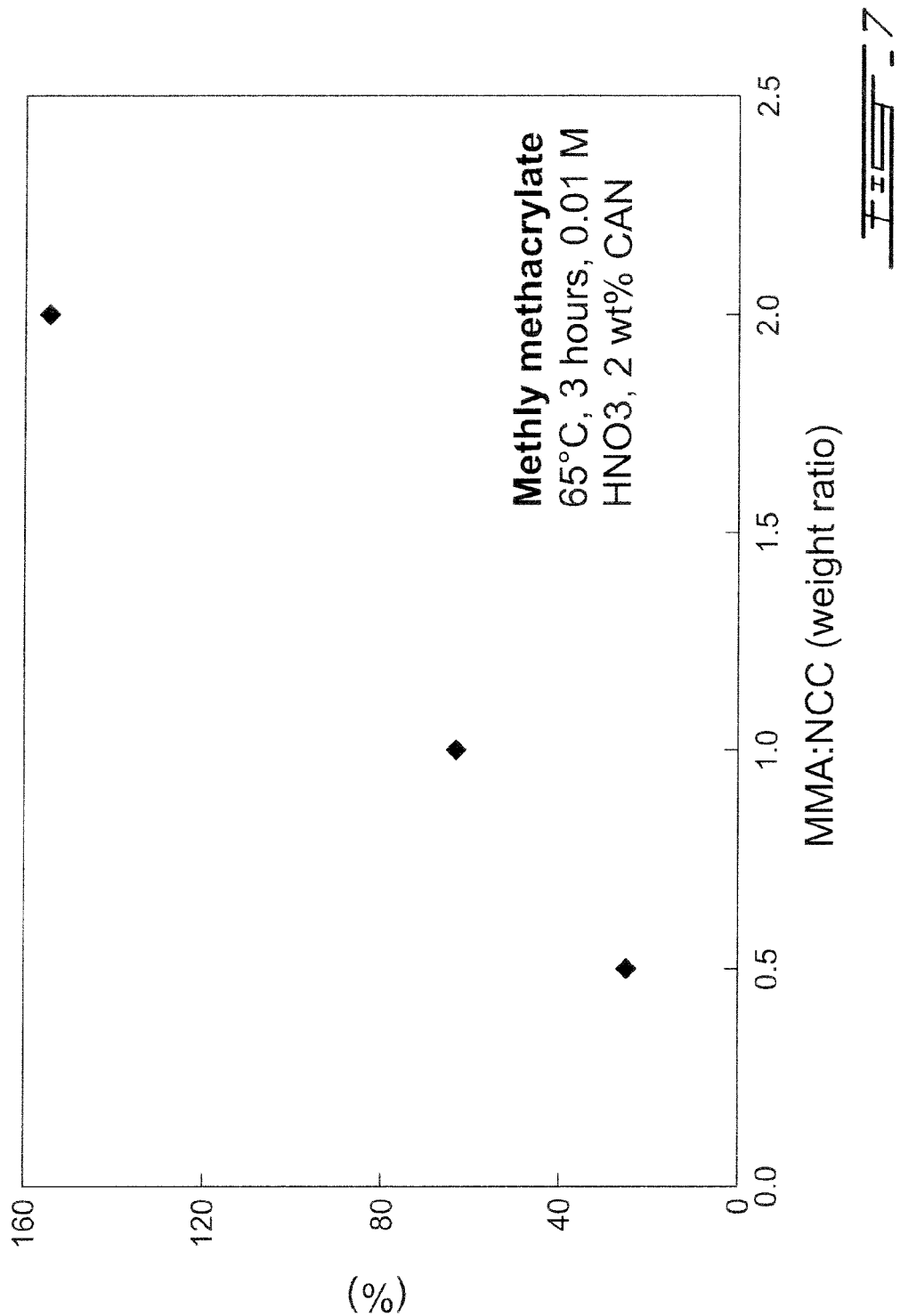
FIG. 7 shows % nanocomposite produced for different MMA:NCC ratios in the polymerization mix.

If the monomer weight ratio is increased then the grafting yield, at same reaction conditions, will also increase. FIGS. 7. and 8 are graphs confirming the trends for MMA and VAc.

In general the polymerization proceeds with grafting of the vinyl monomer on the NCC, and polymerization of such monomer with further monomer to form a polymer chain extending from the NCC.

The nanocomposite may be blended or compounded with high MW polymer, generally the non-grafted free polymers will be removed from the nanocomposite before such blending or compounding, but if PMMA is to be employed as high MW polymer, then it is not necessary to remove the free PMMA polymers present in the produced PMMA-g-NCC. If, on the other hand, polystyrene is employed as high MW polymer for blending with the PMMA-g-NCC, then it is necessary to remove free homopolymers of PMMA.

Suitable high MW polymers have a molecular weight of 20,000 to several million, for example 20,000 to 5,000,000; suitable polymers include polymethyl methacrylate, polyvinyl acetate and polystyrene.

In a specific embodiment, surface graft co-polymerization of vinyl acetate (VAc) or methyl methacrylate (MMA) onto NCC is performed according to the following protocol. The inhibitors in the monomer are first removed by an inhibitor removal column. NCC suspension in water is first mixed with VAc or MMA and diluted with deionized (DI) water to the required concentration. The mass ratio of NCC to MMA (or VAc) is adjustable and 1:2 is used in this case. In the final reaction solution, the concentration of NCC is controlled to be 3% w/w, and the pH of the reaction solution is adjusted to be acidic by using for example $HNO_3$, and targeting, for instance, pH=2. The required quantity of a free radical initiator, for example eerie ammonium nitrate (CAN), is dissolved in DI water with the desired amount of $HNO_3$. Both CAN and NCC solutions are then bubbled with nitrogen for 30 mins, for instance. The polymerization starts by adding the CAN solution into the NCC solution and allowing the reaction to proceed for a certain time at a specific temperature. Near the end of the reaction, 100 µl of hydroquinone (for example, 1% w/w) is added to stop the reaction, and the solid is centrifuged at 4,400 rpm and 30 mins. The ungrafted poly(vinyl acetate) (PVAc) or poly(methyl methacrylate) (PMMA) is extracted by acetone using, for example, Soxhlet extraction for at least 3 days. After the extraction is completed, the PMMA-g-NCC or PVAc-g-NCC nanocomposite material is dried under vacuum at room temperature overnight. To determine the optimal reaction conditions for the surface graft polymerization, a series experiments are carried out for vinyl acetate and methyl methacrylate, respectively. The optimal conditions are listed in Table 1.

The ratio of grafted polymer to NCC range can widely vary for different monomers, and it is also dependent on amount of monomer added. By way of illustration, for 1:1 MMA:NCC ratio, the grafted PMMA:NCC ratio is 0.63:1; for 2:1 VAc:NCC, the grafted PVAc:NCC is 0.12:1.

A variety of acids, including mineral acids, such as nitric, hydrochloric and sulphuric acids, as well as organic acids such as acetic acid are suitable for conducting the polymerization reaction.

EXAMPLES

Example 1

Figure 2A:
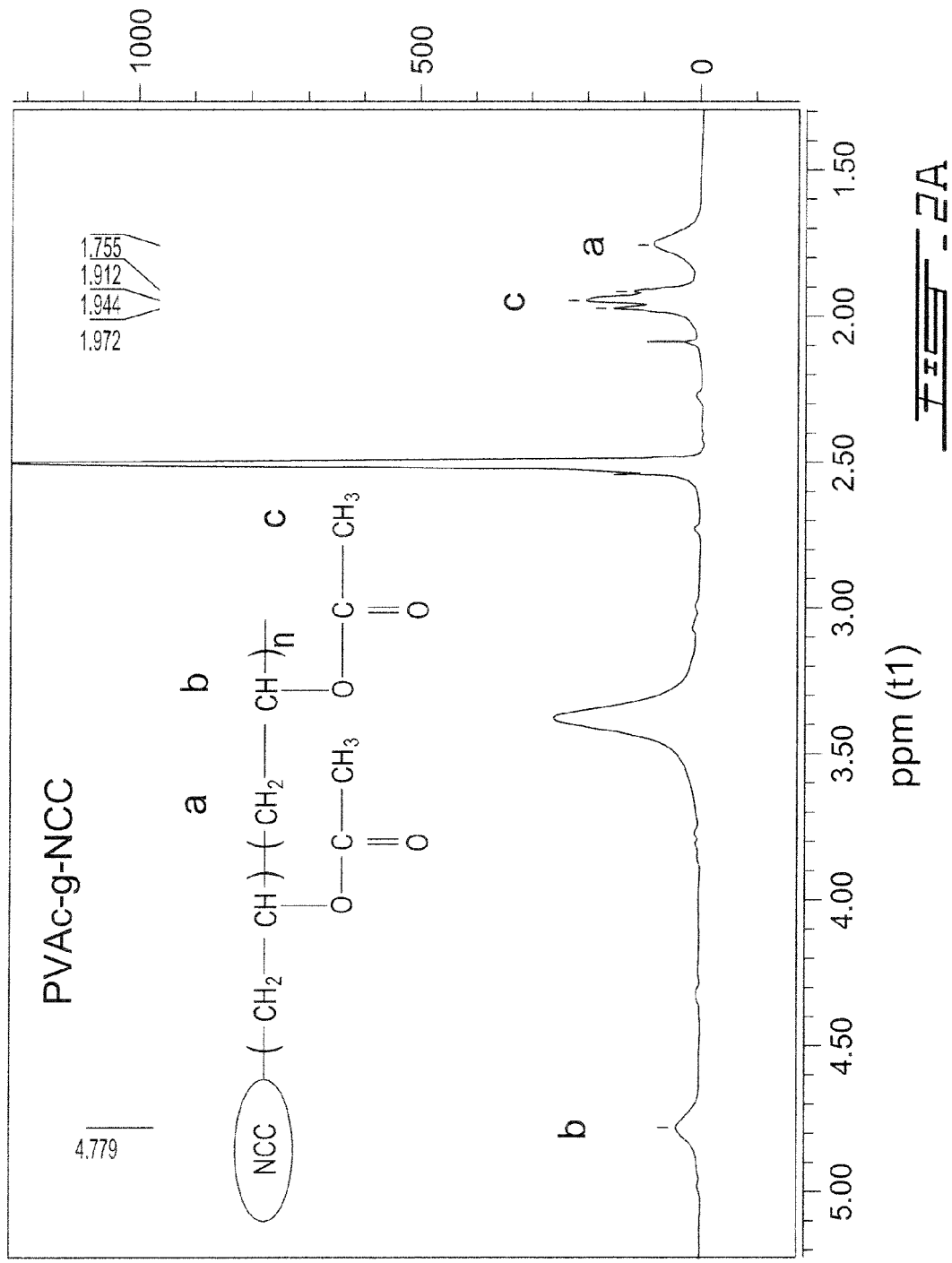
Figure 3A:
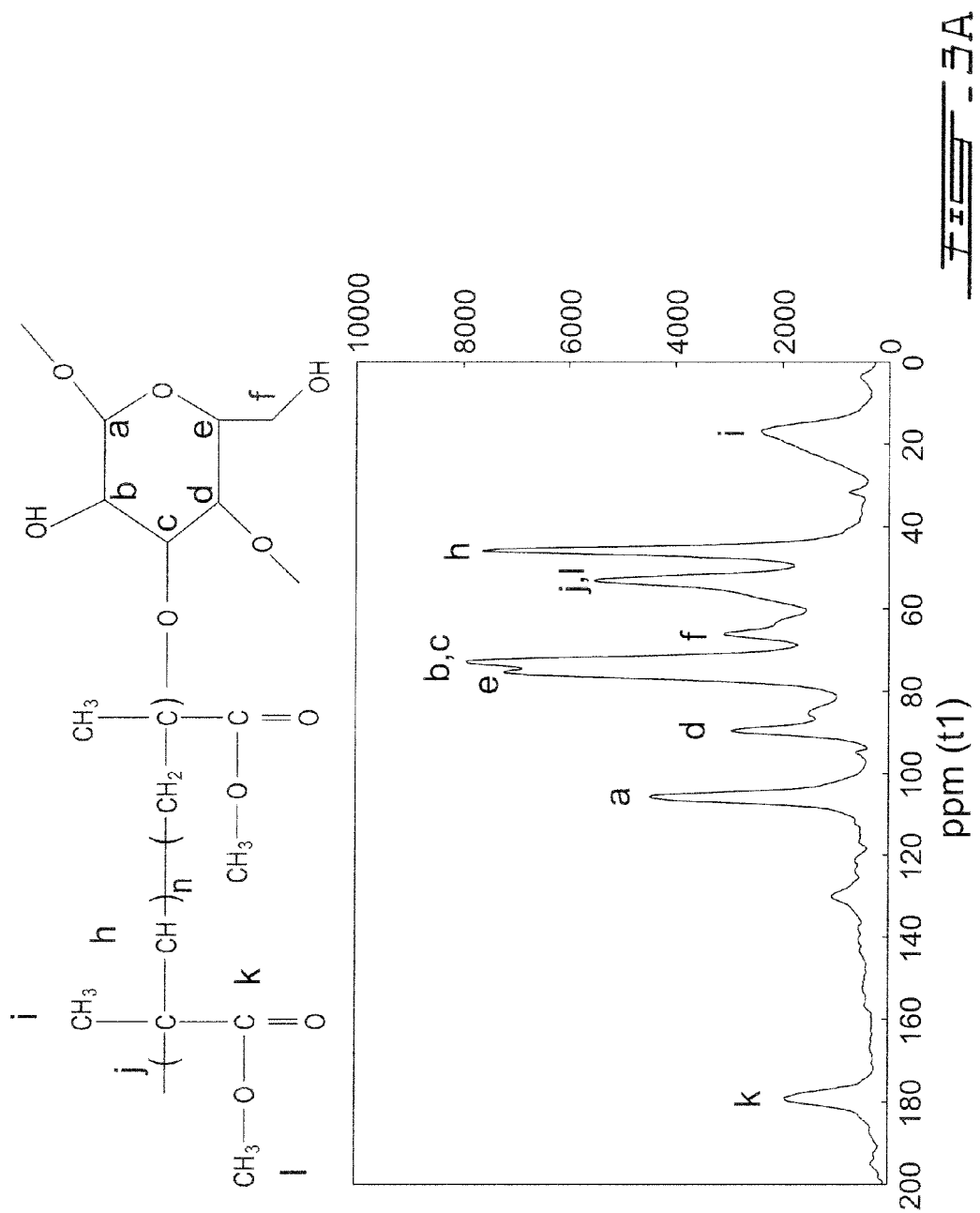

Nanocomposites were produced in accordance with the above protocol. Evidence of the successful surface graft co-polymerization of the vinyl monomers onto NCC, i.e. the determination whether PVAc or PMMA is grafted onto NCC, is carried out using Fourier-transform infra-red (FT-IR) and/or nuclear magnetic resonance (NMR). In FIG. 1, after graft co-polymerization, two peaks are particularly evident compared to the original NCC. Peak 1734 $cm^{-1}$ is the C=O vibration and peak 1241 $cm^{-1}$ corresponds to C—O vibration in the ester group, respectively. The occurrence of grafting of PVAc and PMMA is further confirmed by $^1H$ NMR. In FIG. 2, for PVAc-g-NCC, the peak a at 1.755 denotes the —$CH_2$-protons, and peak c (from 1.9-1.97) denotes the —$CH_3$ protons, while the peak b at 4.78 donates the —CH— proton.[9] In the NMR spectrum for PMMA-g-NCC, peak h (0.84 and 1.02) donates the methyl protons on carbon, while peak c (3.6) donates the methyl protons on oxygen. The peak a 1.81 donates the —$CH_2$-protons.[10] In addition to solution NMR, solid-state $^{13}C$ NMR was carried out on the PMMA-g-NCC sample to provide conclusive proof of the successful surface grafting onto NCC. As evident in FIG. 3, all the specific peaks can be assigned according to literature.[11, 12]

Example 2

The size of NCC and PMMA-g-NCC particles can be detected using a high-definition particle size analyzer (e.g. a Zetesizer), which measures the hydrodynamic diameter of an equivalent sphere. NCC is suspended in water, while PMMA-g-NCC is suspended in either chloroform or tetrahydrofuran (THF). The size of PMMA-g-NCC, shown in Table 2, can be changed with different polymerization recipes. If 1:1 MMA:NCC is used, the product cannot be suspended in solvent, which means there is not enough MMA grafted onto the NCC to make it suspended in a suitable organic solvent. On the other hand, if less initiator is used, the resulting PMMA-g-NCC will be larger in size than cases when more initiator is used. This is explained by the fact that more initiator would make the PMMA chain shorter, which will result in smaller size of the PMMA-g-NCC particle. Finally, PMMA-g-NCC tends to be smaller in THF than in chloroform. Table 2 also indicates the grafting yield for 2 conditions, confirming efficient and success grafting.

Example 3

Figure 4:
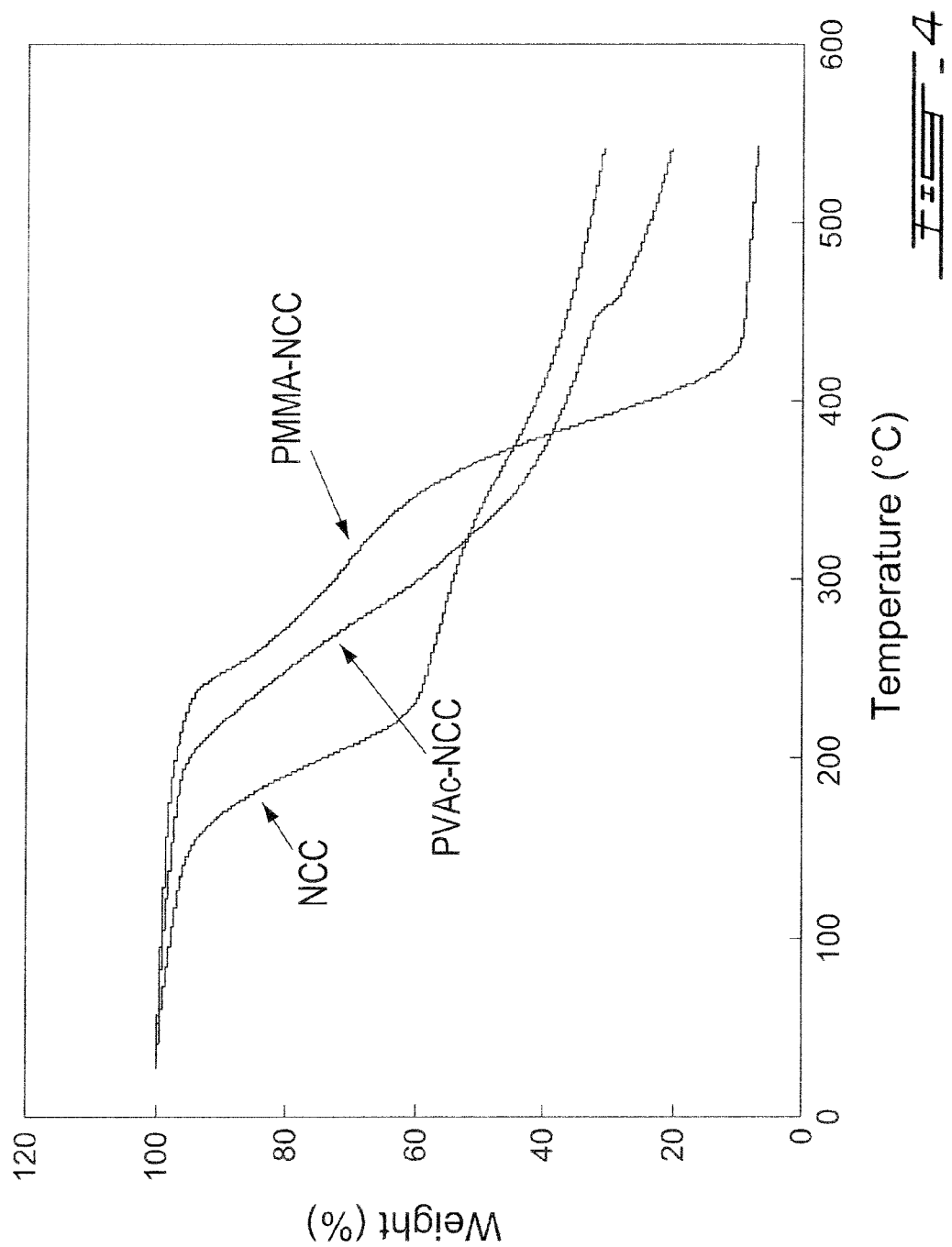
FIG. 4 is a thermogravimetric analysis of NCC, PVAc-g-NCC and PMMA-g-NCC.
Figure 5:
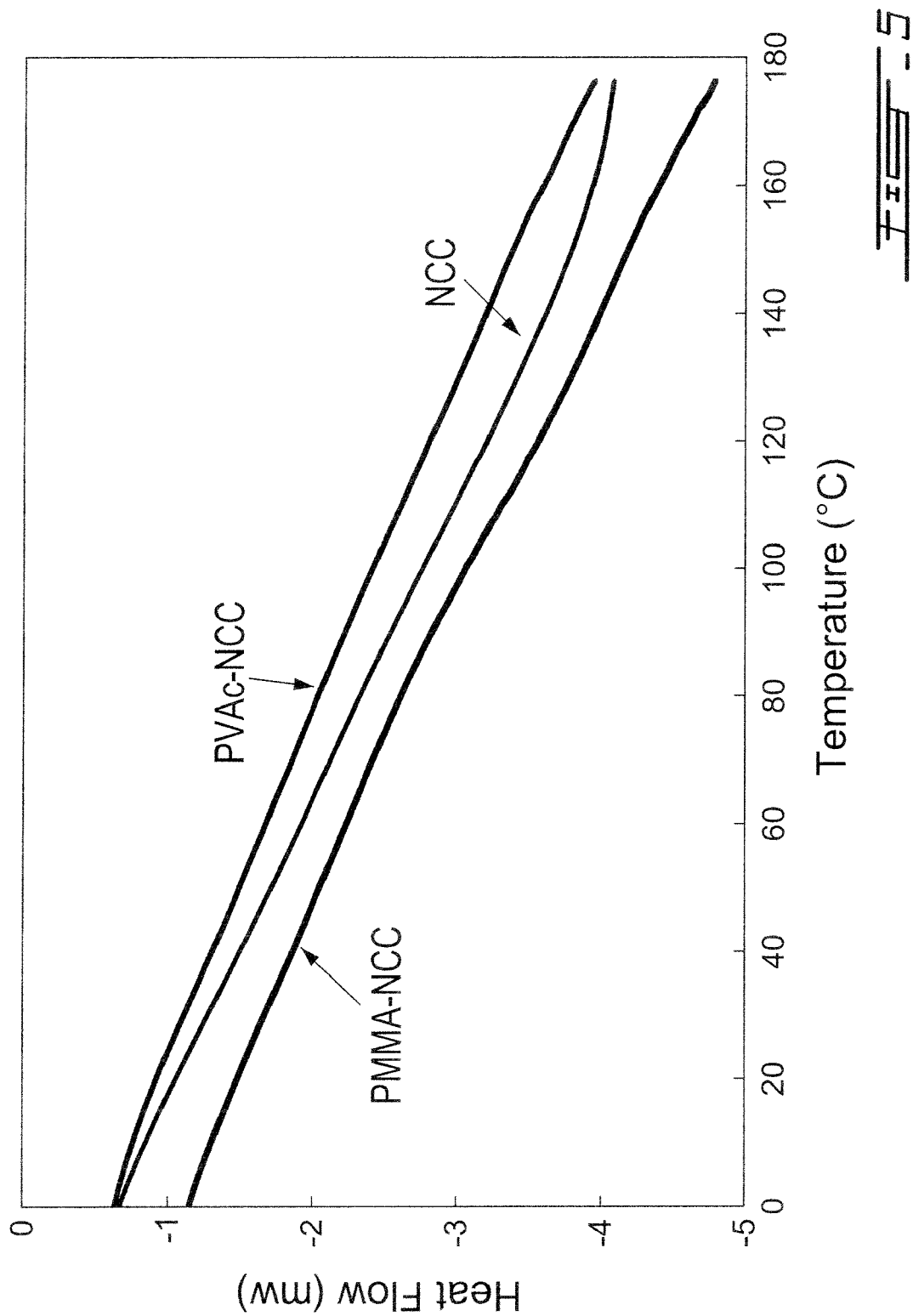
FIG. 5 is a differential scanning calorimetry of NCC, PVAc-g-NCC and PMMA-g-NCC.

Thermogravimetric (TG) data, presented in FIG. 4, demonstrates that both PVAc-g-NCC and PMMA-g-NCC are more thermally stable than the original NCC. This indicates that it would be possible to process these nanocomposites using conventional polymer processing techniques, for example, extrusion. In FIG. 5, the differential scanning calirometry (DSC) data illustrate that there is no detectable slope change for PVAc-g-NCC, however, for PMMA-g-NCC, there is an obvious change of slope around 100° C. which is the Tg for PMMA. This is probably because the amount of grafted PVAc is not high enough to be detected by DSC. However, for NCC, the slope changes above 160° C. and the likely reason for this is that at temperatures above 160° C. NCC starts to degrade, so there is an exothermic response in the DSC curve. The TG curve for NCC in FIG. 4 confirms that the degradation of NCC starts just above 160° C.

Example 4

Figure 6:
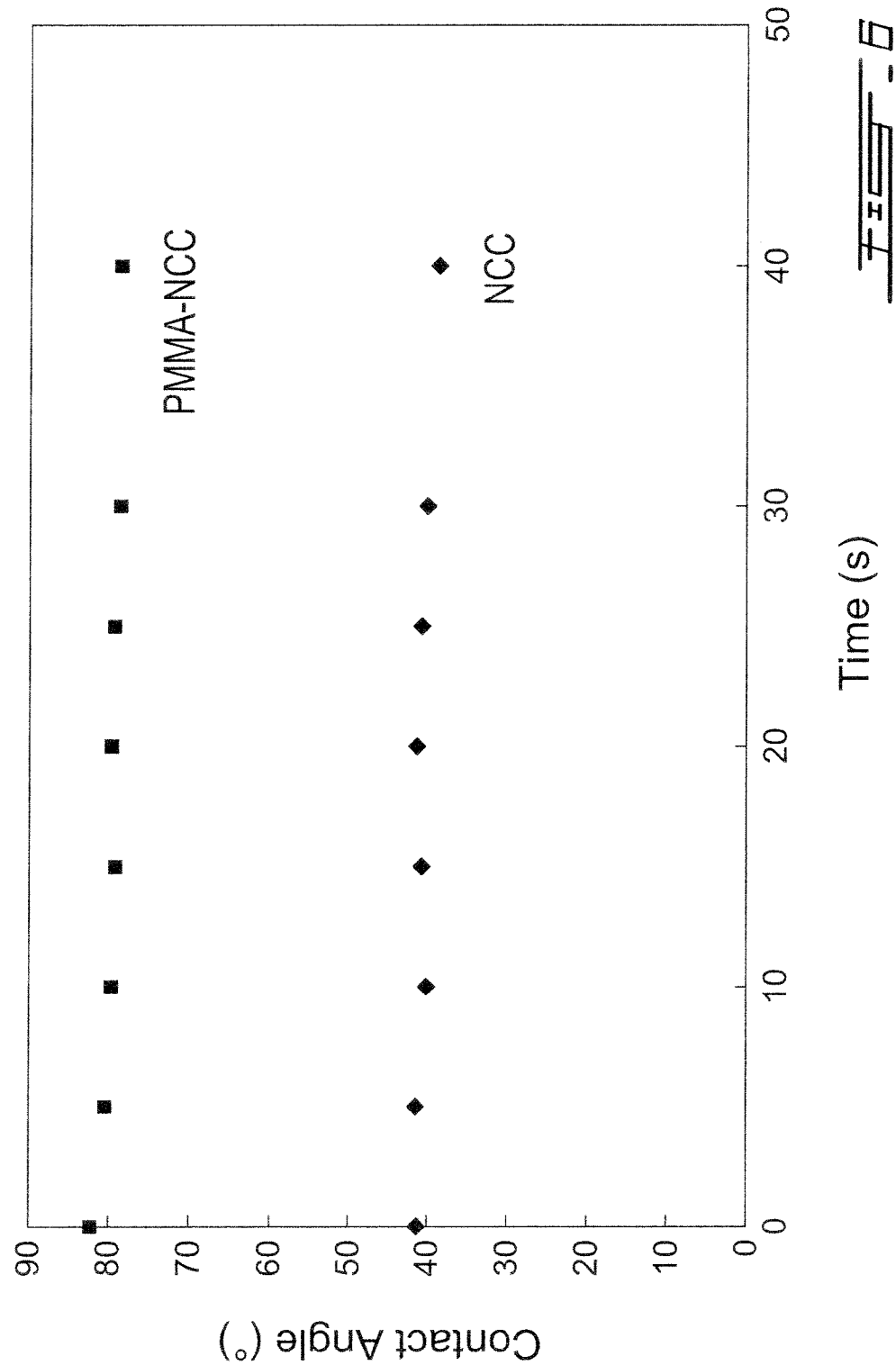
FIG. 6 shows the water contact angle of NCC and PMMA-g-NCC indicating, the improved hydrophobicity in the nanocomposite case.

Water contact angle measurement is employed to determine the surface hydrophobicity of both NCC and PMMA-g-NCC. FIG. 6 shows that the water contact angle of the PMMA-g-NCC nanocomposite increased over twice the value for the original NCC, indicating improved hydrophibicity of the new nanocomposite material.

Tables

TABLE 1

Optimal polymerization conditions for vinyl acetate (VAc) and methyl methacrylate (MMA) with nanocrystalline cellulose (NCC).

|  | Temperature (° C.) | Time (hours) | [$HNO_3$] (M) | Initiator dosage (% wt on NCC surface) |
|---|---|---|---|---|
| MMA | 50 | 3 | 0.01 | 2 |
| VAc | 65 | 3 | 0.01 | 2 |

TABLE 2

Size of NCC and PMMA-g-NCC particles in different solvent systems.
Grafting yields for polymerization with 2% CAN are reported.

| Samples | NCC | MMA:NCC 1:1 2% CAN | MMA:NCC 2:1 2% CAN | MMA:NCC 2:1 5% CAN | MMA:NCC 2:1 5% CAN |
|---|---|---|---|---|---|
| Solvent | Water | THF | THF | THF | Chloroform |
| Size (nm) | 45.5 ± 1.2 | Not suspended well | 205.9 ± 18.2 | 126.3 ± 1.1 | 160.8 |
| Grafting yield (%) | N/A | | 63.2 | 77.3 | |

REFERENCES

1. Samir, M.; Alloin, F.; Dufresne, A., Review of recent research into cellulosic whiskers, their properties and their application in nanocomposite field. *Biomacromolecules* 2005, 6, (2), 612-626.
2. Lima, M. M. D.; Borsali, R., Rodlike cellulose microcrystals: Structure, properties, and applications. *Macromolecular Rapid Communications* 2004, 25, (7), 771-787.
3. Araki, J.; Wada, M.; Kuga, S. Steric stabilization of a cellulose microcrystal suspension by poly(ethylene glycol) grafting. *Langmuir* 2001, 17, (1), 21-27.
4. Habibi, Y.; Dufresne, A., Highly filled bionanocomposites from functionalized polysaccharide nanocrystals. *Biomacromolecules* 2008, 9, (7), 1974-1980.
5. Ljungberg, N.; Bonini, C.; Bortolussi, F.; Boisson, C.; Heux, L.; Cavaille, J. Y. New nanocomposite materials reinforced with cellulose whiskers in atactic polypropylene: Effect of surface and dispersion characteristics. *Biomacromolecules* 2005, 6, (5), 2732-2739.
6. Bhattacharya, A.; Misra, B. N., Grafting: a versatile means to modify polymers —Techniques, factors and applications. *Progress in Polymer Science* 2004, 29, (8), 767-814.
7. Don, T. M.; King. C. F.; Chiu, W. Y., Synthesis and properties of chitosan-modified poly(vinyl acetate). *Journal of Applied Polymer Science* 2002, 86, (12), 3057-3063.
8. Lai, S. M.; Don, T. M.; Liu, Y. H.; Chiu, W. Y., Graft polymerization of vinyl acetate onto granular starch: Comparison on the potassium persulfate and eerie ammonium nitrate initiated system. *Journal Applied Polymer Science* 2006, 102, (3), 3017-3027.
9. Chen, F.; Cheng, Z. P.; Zhu, J.; Zhang, W.; Zhu, X. L., Synthesis of poly(vinyl acetate) with fluorescence via a combination of RAFT/MADIX and "click" chemistry. *European Polymer Journal* 2008, 44, (6), 1789-1795.
10. Lee, H. F.; Kuo, S. W.; Huang, C. F.; Lu, J. S.; Chan, S. C.; Wang, C. F.; Chang, F. C., Hydrogen-bonding interactions mediate the phase behavior of an A-B/C block copolymer/homopolymer blend comprising poly(methyl methacrylate-b-vinylpyrrolidone) and poly(vinylphenol). *Macromolecules* 2006, 39, (16), 5458-5465.
11, Kristensen, 0.1. H.; Bampos, N.; Duer, M. Solid state C-13 CP MAS NMR study of molecular motions and interactions of urea adsorbed on cotton cellulose. *Physical Chemistry Chemical Physics* 2004, 6, (12), 3175-3183.
12. Kuo, S. W.; Chang, F. C., Miscibility and hydrogen bonding in blends of poly(vinylphenol-co-methyl methacrylate) with poly(ethylene oxide). *Macromolecules* 2001, 34, (12), 4089-4097.

The invention claimed is:

1. A composition comprising a hydrophobic nanocomposite of nanocrystalline cellulose (NCC) and polymerized hydrophobic vinyl monomer, in which said polymerized vinyl monomer is grafted on said NCC, compounded or blended with a polymer having a molecular weight of 20,000 to 5,000,000.

2. A composition of claim 1, wherein said polymer is selected from the group consisting of polymethyl methacrylate, polyvinyl acetate, and polystyrene.

3. A composition of claim 1, wherein said vinyl monomer is selected from vinyl acetate, methyl methacrylate, methyl acrylate, ethyl acrylate and mixtures thereof.

4. A composition of claim 1, wherein said vinyl monomer is one having a water solubility of from about 1.5 to about 3 g/100 ml.

5. A composition of claim 2, wherein said vinyl monomer is selected from vinyl acetate, methyl methacrylate, methyl acrylate, ethyl acrylate and mixtures thereof.

6. A composition of claim 1, wherein said vinyl monomer is grafted to said NCC via an oxide link through a hydroxyl on the NCC and an opened olefinic bond of the vinyl monomer.

7. A composition of claim 5, wherein said vinyl monomer is grafted to said NCC via an oxide link through a hydroxyl on the NCC and an opened olefinic bond of the vinyl monomer.

8. A composition of claim 1, wherein said polymerized vinyl monomer is a homopolymer.

9. A composition of claim 1, wherein said polymerized vinyl monomer is a copolymer.

10. A composition of claim 2, wherein said polymerized vinyl monomer is a homopolymer.

11. A composition of claim 2, wherein said polymerized vinyl monomer is a copolymer.

* * * * *